United States Patent
Kishi (10) Patent No.: US 7,476,890 B2
(45) Date of Patent: Jan. 13, 2009

(54) OPTICAL COUPLING DEVICE WITH A DETECTING ELEMENT IN THE DRIVER THAT PROVIDES UNIFORM INTENSITY OF AN OPTICAL SIGNAL

(75) Inventor: Motoharu Kishi, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 0 days.

(21) Appl. No.: 11/582,313

(22) Filed: Oct. 18, 2006

(65) Prior Publication Data

US 2007/0090307 A1    Apr. 26, 2007

(30) Foreign Application Priority Data

Oct. 20, 2005    (JP) .............................. 2005-306007

(51) Int. Cl.
*G02B 27/00* (2006.01)

(52) U.S. Cl. .................. 250/551; 250/214.1; 385/14; 385/92; 398/137; 398/195

(58) Field of Classification Search ............. 250/208.1, 250/214.1, 551; 385/14, 88, 89, 92, 129, 385/130, 131, 132; 398/137, 138, 162, 195, 398/212, 213; 372/29.01, 29.011, 29.014, 372/29.015, 29.02, 29.021, 31, 38.01, 38.02, 372/38.07; 330/110, 279, 308, 151
See application file for complete search history.

(56) References Cited

U.S. PATENT DOCUMENTS

| | | | | | |
|---|---|---|---|---|---|
| 4,733,094 | A | * | 3/1988 | Carpentier et al. .......... | 250/551 |
| 6,144,222 | A | * | 11/2000 | Ho ............................... | 326/82 |
| 6,481,856 | B1 | * | 11/2002 | Weissman et al. ............. | 353/98 |
| 6,841,771 | B2 | * | 1/2005 | Shimizu .................. | 250/214 A |
| 2003/0103772 | A1 | | 6/2003 | Ishii et al. | |
| 2005/0006566 | A1 | * | 1/2005 | Maeda .................... | 250/214 R |

FOREIGN PATENT DOCUMENTS

| | | |
|---|---|---|
| EP | 0 668 670 A1 | 8/1995 |
| JP | 09-172225 | 6/1997 |
| JP | 2002-353495 | 12/2002 |
| WO | WO 2004/066509 A2 | 8/2004 |

OTHER PUBLICATIONS

European Search Report dated Nov. 5, 2007.

* cited by examiner

*Primary Examiner*—Thanh X Luu
*Assistant Examiner*—Francis M Legasse, Jr.
(74) *Attorney, Agent, or Firm*—McGinn IP Law Group, PLLC (57) ABSTRACT

A photocoupler includes a LED for emitting light in accordance with an input electrical signal, a driver for supplying an electrical signal to the LED, a light receiver placed face to face with the LED and having a photodiode for receiving light emitted by the LED, and a half mirror placed between the LED and the photodiode, for changing the direction of light emitted by the LED. The photocoupler controls the current to be supplied to the LED in accordance with the reflected light by the half mirror to uniformize the light emission intensity of the LED.

16 Claims, 6 Drawing Sheets

RELATED ART

OPTICAL COUPLING DEVICE WITH A DETECTING ELEMENT IN THE DRIVER THAT PROVIDES UNIFORM INTENSITY OF AN OPTICAL SIGNAL

BACKGROUND OF THE INVENTION

1. Field of the Invention

The present invention relates to an optical coupling device including a light emitting element and a light receiving element and particularly to an optical coupling device capable of controlling light emission intensity from the light emitting element.

2. Description of Related Art

A photocoupler is used in various locations such as factories, plants, and electrical household appliances for the purpose of eliminating a large common mode noise and ensuring safety. The photocoupler has a configuration where a light emitting element such as a light emitting diode (LED) which emits light in accordance with an input signal and a light receiving element such as a photodiode which outputs a current in accordance with an incident light intensity are optically coupled, and its input and output are electrically disconnected.

A large common mode noise occurs often in the sites where high-power equipment and high-sensitivity electronic equipment coexist with a difference in power supply voltage exceeding 1000V, such as factories and plants. There has been a recent demand for controlling AC servos and inverters which are used in factories or the like highly accurately. To meet this demand, a photocoupler is required to exhibit higher common-mode rejection (CMR) and lower pulse width distortion, and various techniques have been proposed therefor, including Japanese Unexamined Patent Application Publication No. 2002-353495 (Shimizu), for example.

Figure 5:
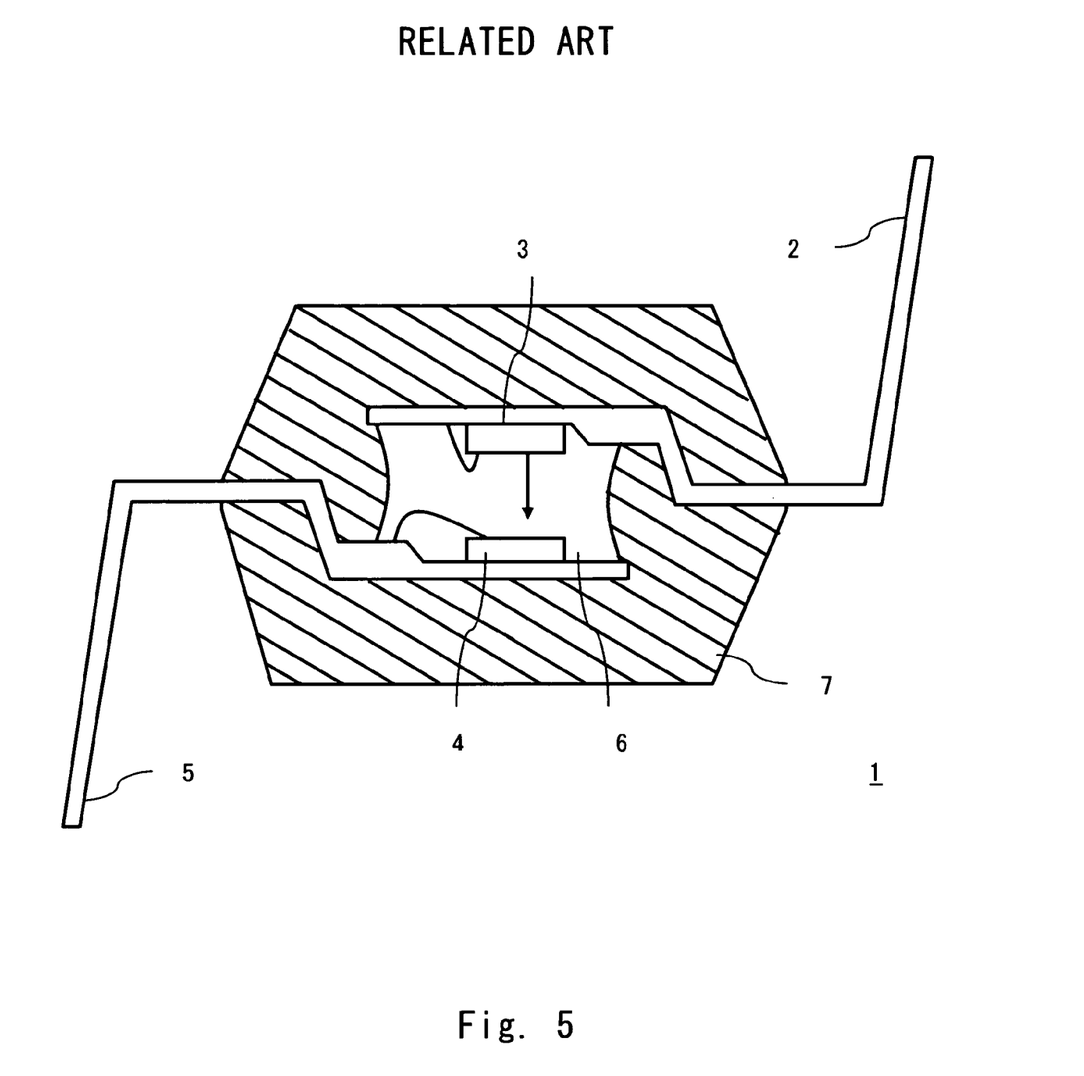
FIG. 5 is a view showing the configuration of a photocoupler according to a related art.

FIG. 5 illustrates the configuration of a photocoupler 1 taught by Shimizu. The photocoupler 1 converts an electrical signal which is input through an input terminal 2 into an optical signal in a light emitter 3, then converts the optical signal back to an electrical signal in a light receiver 4 on the output side, and finally outputs the electrical signal through an output terminal 5. A light emitting element on the light emitter 3, such as a LED, and a light receiving element on the light receiver 4, such as a photodiode, are disposed face to face each other in close proximity. A light transmitting resin 6 having a prescribed dielectric constant is filled in the gap between the light emitting element and the light receiving element. The light emitter 3, the light receiver 4, and the light transmitting resin 6 are sealed in one package by a light shielding resin 7. The input-side circuit and the output-side circuit are thereby electrically shielded from one another, thereby enabling signal transmission under the condition where devices are electrically disconnected.

Figure 6:
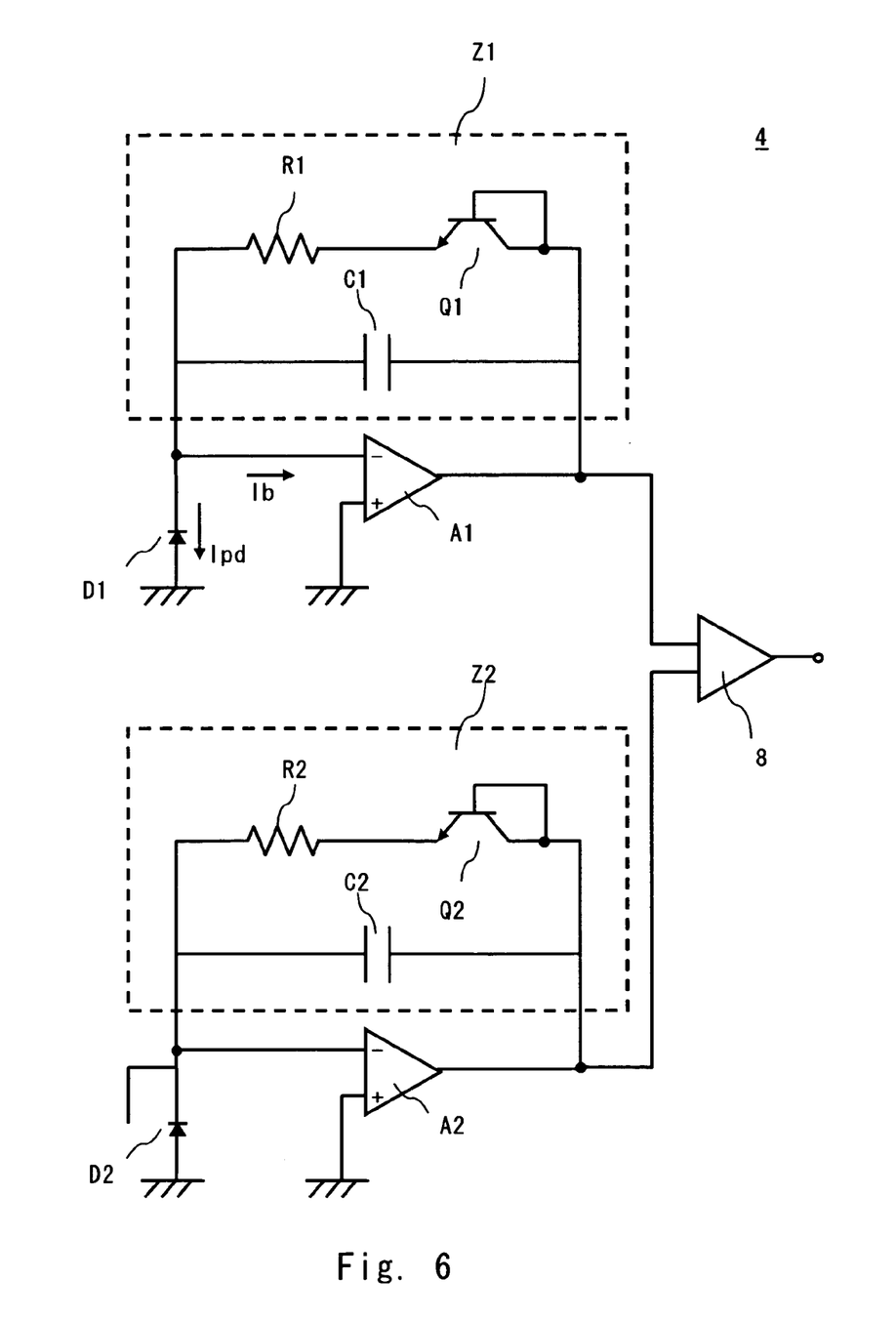
FIG. 6 is a view showing the configuration of a light receiver used in the photocoupler according to a related art.

FIG. 6 illustrates the configuration of the light receiver 4 taught by Shimizu. As shown in FIG. 6, the light receiver 4 includes a photodiode D1 and a dummy photodiode D2 which are arranged adjacent to each other. The photodiode D1 receives an optical signal from the light emitting element. A light receiving surface of the dummy photodiode D2 is shielded from light by a cathode electrode. The output currents from the photodiodes D1 and D2 are respectively converted into voltages by current-voltage conversion amplifiers A1 and A2. The voltages converted by the current-voltage conversion amplifiers A1 and A2 are then compared with each other by a hysteresis comparator 8, and finally output as waveform-shaped pulses. This enables improvement in a common-mode rejection ratio (CMRR).

The light receiver 4 further includes impedance variable circuits Z1 and Z2 in which impedance decreases as the level of a current input to the amplifier increases. In such a configuration, if a current signal Ipd is Low, the impedance of the impedance variable circuit Z1 increases. This reduces the bandwidth of the amplifier to suppress the high-frequency component of a noise and substantially equalizes the values of Z1 and Z2. The characteristics of the current-voltage conversion amplifiers A1 and A2 are thereby aligned to improve the CMRR. On the other hand, although the reduction of the bandwidth of the amplifier causes rounding of the received waveform, it is output because a threshold level of the hysteresis comparator 8 is constant. The pulse waveform is thereby distorted, resulting in large pulse width distortion. If, on the other hand, the current signal Ipd is High, the impedance of the impedance variable circuit Z1 decreases. This enlarges the bandwidth of the amplifier to achieve low pulse width distortion. Instead, the high frequency component of a noise cannot be suppressed, and the values of Z1 and Z2 thereby differ. The characteristics of the current-voltage conversion amplifiers A1 and A2 are thereby unbalanced to deteriorate the CMRR.

The light emission intensity of LED varies by manufacturing fluctuation, changes over time, ambient temperature variation, and so on. The non-uniform light emission intensity causes fluctuation in the current signal Ipd which is detected by the light receiver 4. In Japanese Unexamined Patent Application Publication No. 9-172225 (Asami et. al.), a technique of monitoring a part of optical power and stabilizing the optical power is disclosed. However, it contains no suggestion for applying this technique to a photocoupler.

According to the related arts, the CMRR and the pulse width distortion are in the relation of trade off each other with respect to a change in the current signal Ipd, thus failing to achieve both high CMR and low pulse width distortion. As a photocoupler operates at higher speed, the restriction of pulse width distortion becomes more strict, i.e. from 100 ns or lower to 10 ns or lower. It is difficult for the techniques according to the related arts to satisfy such restriction.

In view of the foregoing, there is an increasing need for an optical coupling device capable of controlling the light emission intensity from a light emitting element and achieving both high CMR and low pulse width distortion.

SUMMARY OF THE INVENTION

According to a first aspect of the present invention, there is provided an optical coupling device including a light emitting element, a driver for supplying a drive signal to the light emitting element in accordance with an input signal, and a light receiver placed face to face with the light emitting element, for receiving an optical signal output from the light emitting element, converting the optical signal into an electrical signal and outputting the electrical signal, wherein the driver monitors a signal intensity of the optical signal and controls the signal intensity to be uniform. This configuration realizes the achievement of both high CMR and low pulse width distortion.

According to a second aspect of the present invention, the optical coupling device further includes a half mirror placed between the light emitting element and the light receiver, wherein a part of the optical signal enters a light receiving element disposed in the driver. This configuration realizes the achievement of both high CMR and low pulse width distortion.

According to a third aspect of the present invention, the optical coupling device further includes a light reflector placed on a surface of the light receiver, for reflecting a part of the optical signal, wherein a part of the optical signal enters a light receiving element disposed in the driver. This configuration realizes the achievement of both high CMR and low pulse width distortion.

According to a fourth aspect of the present invention, in the optical coupling device, the light emitting element is a light emitting diode (LED), and the light receiving element is a photodiode. The present invention is particularly effective in such a case.

According to a fifth aspect of the present invention, in the optical coupling device, the driver includes the light receiving element, a first current mirror circuit driven by an optical current generated by the light receiving element based on a part of the optical signal, a second current mirror circuit driven by a differential current of an output current from the first current mirror circuit and a constant current supply, and a switching circuit for switching an output current from the second current mirror circuit with the input signal to turn ON/OFF the light emitting element. This circuit configuration easily realizes the achievement of both high CMR and low pulse width distortion.

According to a sixth aspect of the present invention, in the optical coupling device, the driver is integrated in one chip.

According to a seventh aspect of the present invention, in the optical coupling device, the light receiver includes a photodiode, a first amplifier connected to the photodiode, a dummy photodiode having substantially the same configuration as the photodiode, a second amplifier connected to the dummy photodiode, and a differential amplifier for receiving outputs from the first amplifier and the second amplifier. This configuration achieves higher CMR.

The present invention provides an optical coupling device which realizes the achievement of both high CMR and low pulse width distortion at the same time.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
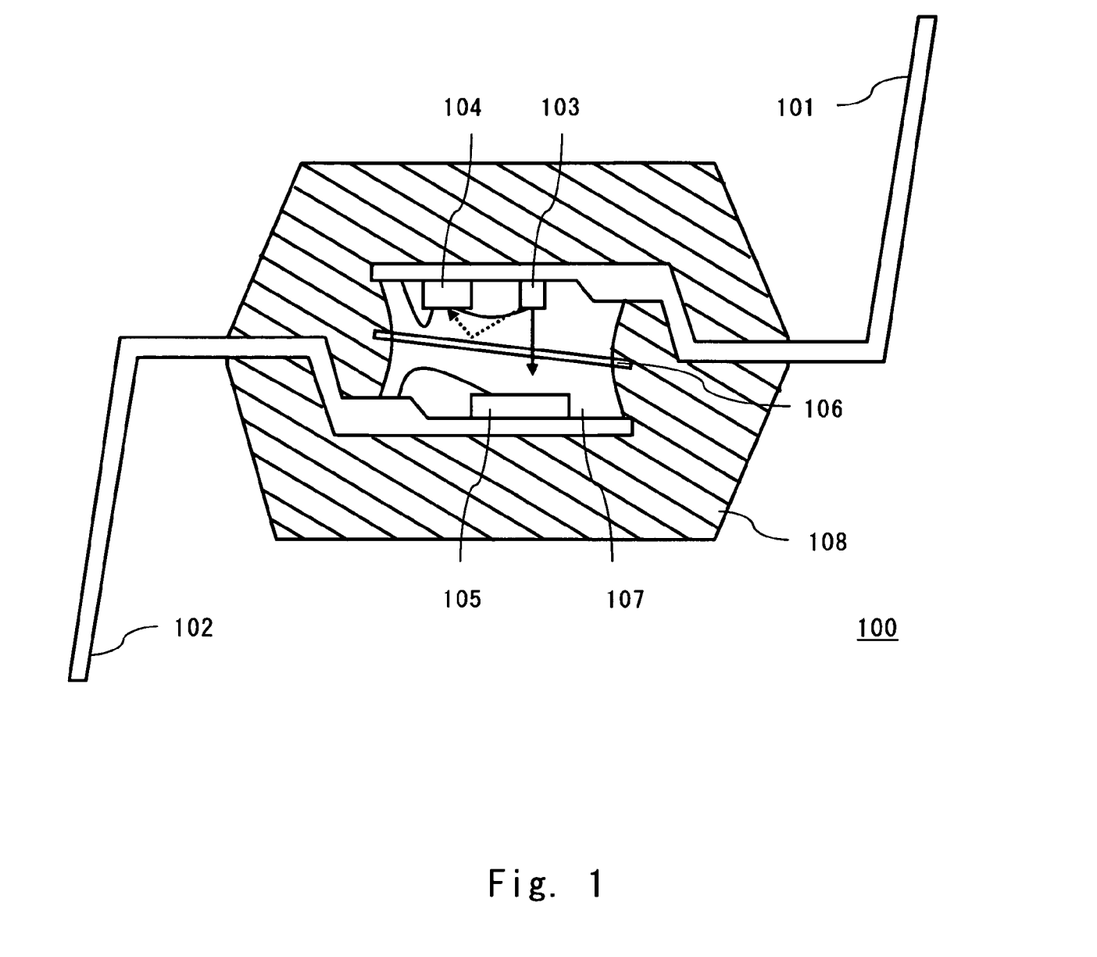
FIG. 1 is a view showing the configuration of a photocoupler according to a first embodiment of the present invention.
Figure 2:
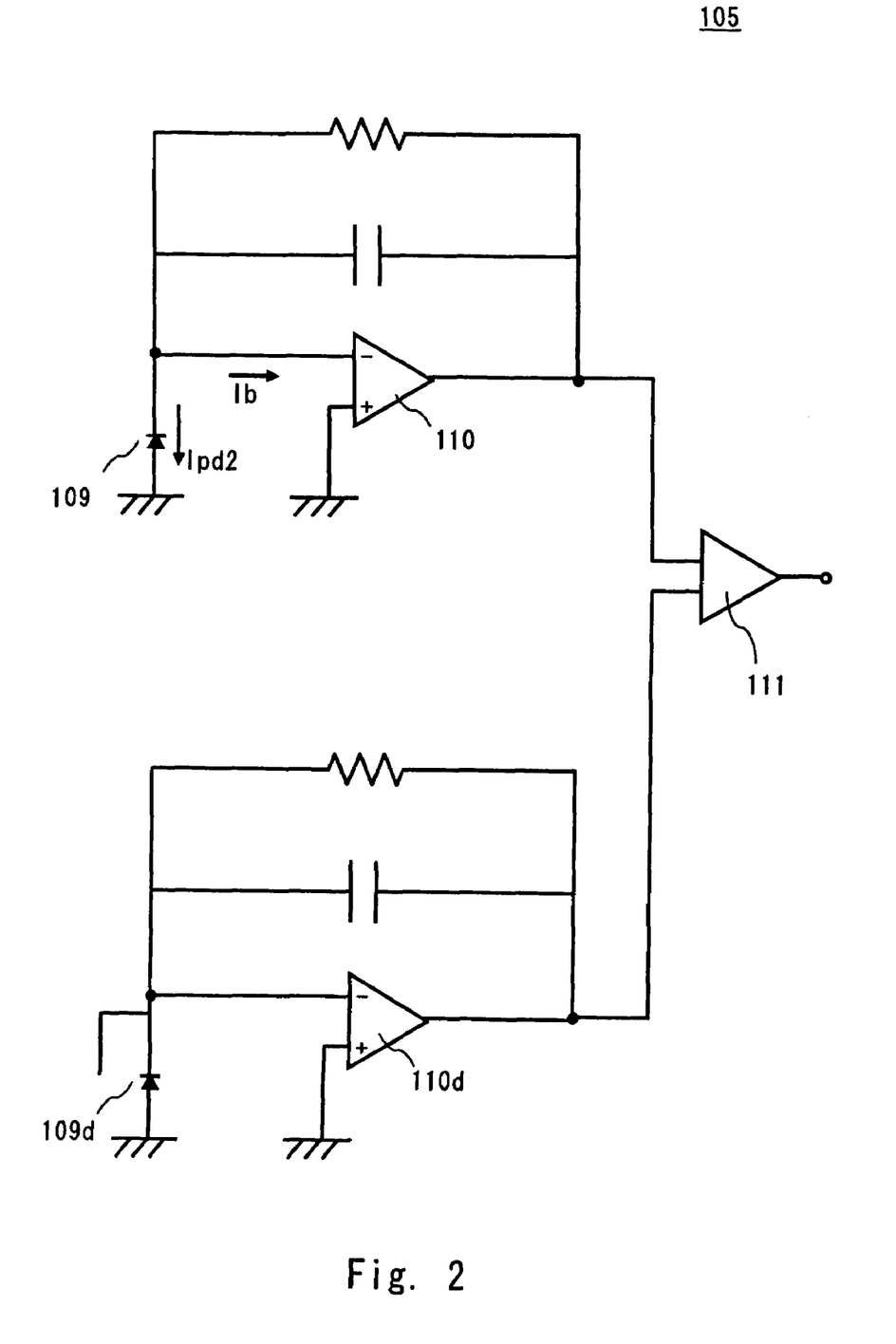
FIG. 2 is a view showing the configuration of a light receiver used in the photocoupler according to a first embodiment of the present invention.

An optical coupling device according to a first exemplary embodiment of the present invention is described hereinafter with reference to FIGS. 1 and 2. FIG. 1 is a view showing the configuration of a photocoupler 100, which is an example of the optical coupling device according to this embodiment. FIG. 2 is a view showing the electrical configuration of a light receiver used in the photocoupler 100. Referring first to FIG. 1, the photocoupler 100 includes an input lead frame 101, an output lead frame 102, a light emitting diode (LED) 103, a driver 104, a light receiver 105, a half mirror 106, a light transmitting resin 107, and a light shielding resin 108. The photocoupler 100 converts an electrical signal which is input through the input lead frame 101 into an optical signal in the driver 104, then converts the optical signal back to an electrical signal in the light receiver 105 on the output side, and outputs the electrical signal through the output lead frame 102. The photocoupler 100 of this embodiment has the semi-transmissive half mirror 106 placed between the LED 103 and the light receiver 105 in order to uniformize the light emission intensity of the LED 103.

As shown in FIG. 1, the input lead frame 101 and the output lead frame 102 are placed opposite to each other, being electrically disconnected from one another, and fixed by the light shielding resin 108. The LED 103 which is a light emitting element is die-bonded on the input lead frame 101. Further, the driver 104 is wire-bonded on the input lead frame 101. The driver 104 turns ON/OFF (switches) the light emission of the LED 103 at high speed in accordance with an input signal. The LED 103 is electrically connected with an output terminal of the driver 104 through a wire such as a metal line. The light receiver 105 is wire-bonded on the output lead frame 102. The light receiver 105 outputs a signal to the outside.

Referring next to FIG. 2, the light receiver 105 includes a photodiode 109 for receiving an optical signal from the LED 103, a dummy photodiode 109d, a current-voltage conversion amplifier 110, a current-voltage conversion amplifier 110d, and a comparator 111. The photodiode 109 is connected with the current-voltage conversion amplifier 110, and the dummy photodiode 109d is connected with the current-voltage conversion amplifier 110d. The dummy photodiode 109d is placed adjacent to the photodiode 109.

The photodiode 109 and the dummy photodiode 109d have substantially the same configuration with substantially equal shape, capacitance and characteristics. A light-receiving surface of the dummy photodiode 109d is shielded from light by a cathode electrode. The output currents from the photodiode 109 and the dummy photodiode 109d are respectively converted into voltages by the current-voltage conversion amplifiers 110 and 110d, and then input to the comparator 111 which is a differential amplifier. The comparator 111 compares the voltages, waveform-shapes the output from the photodiode 109 into a pulse signal and then outputs the signal. This eliminates the in-phase noise and improves a CMRR.

Referring back to FIG. 1, the light transmitting resin 107 is interposed between the LED 103 and the light receiver 105 and between the driver 104 and the light receiver 105. The LED 103 and the photodiode 109 are placed face to face in such a way that their optical axes are aligned, with the light transmitting resin 107 interposed therebetween. Further, the half mirror 106 is placed inside the light transmitting resin 107 which lies between the LED 103 and the light receiver 105 and between the driver 104 and the light receiver 105 as shown in FIG. 1. The half mirror 106 is a semi-transmissive thin film. The half mirror 106 allows a part of the light emitted from the LED 103 to pass through toward the light receiver 105 as indicated by the arrow in FIG. 1. Accordingly, the photodiode 109 of the light receiver 105 generates a current signal Ipd2 in accordance with the transmitted light. The half mirror 106 further reflects a part of the light emitted from the LED 103 toward the driver 104 as indicated by the dotted arrow in FIG. 1. Thus, the half mirror 106 is an optical element which divides light into two portions and controls the direction of each light portion. Such use of the half mirror 106 enables control of a drive current of the LED 103 using the reflected light emitted by the LED 103 and reflected by the half mirror 106. This is described in detail later.

The half mirror 106 is insulative and thus does not reduce the insulation between the input and output. The material and thickness of the half mirror 106 may be selected appropriately according to required semi-transmissive properties and dielectric strength voltage properties.

The LED 103, the driver 104, the light receiver 105, the half mirror 106 and the light transmitting resin 107 are sealed in one package by the light shielding resin 108, except for the terminal portions of the input lead frame 101 and the output lead frame 102. The input-side circuit (driver 104) and the output-side circuit (light receiver 105) are thereby electrically disconnected, realizing signal transmission under the insulated condition.

Figure 3:
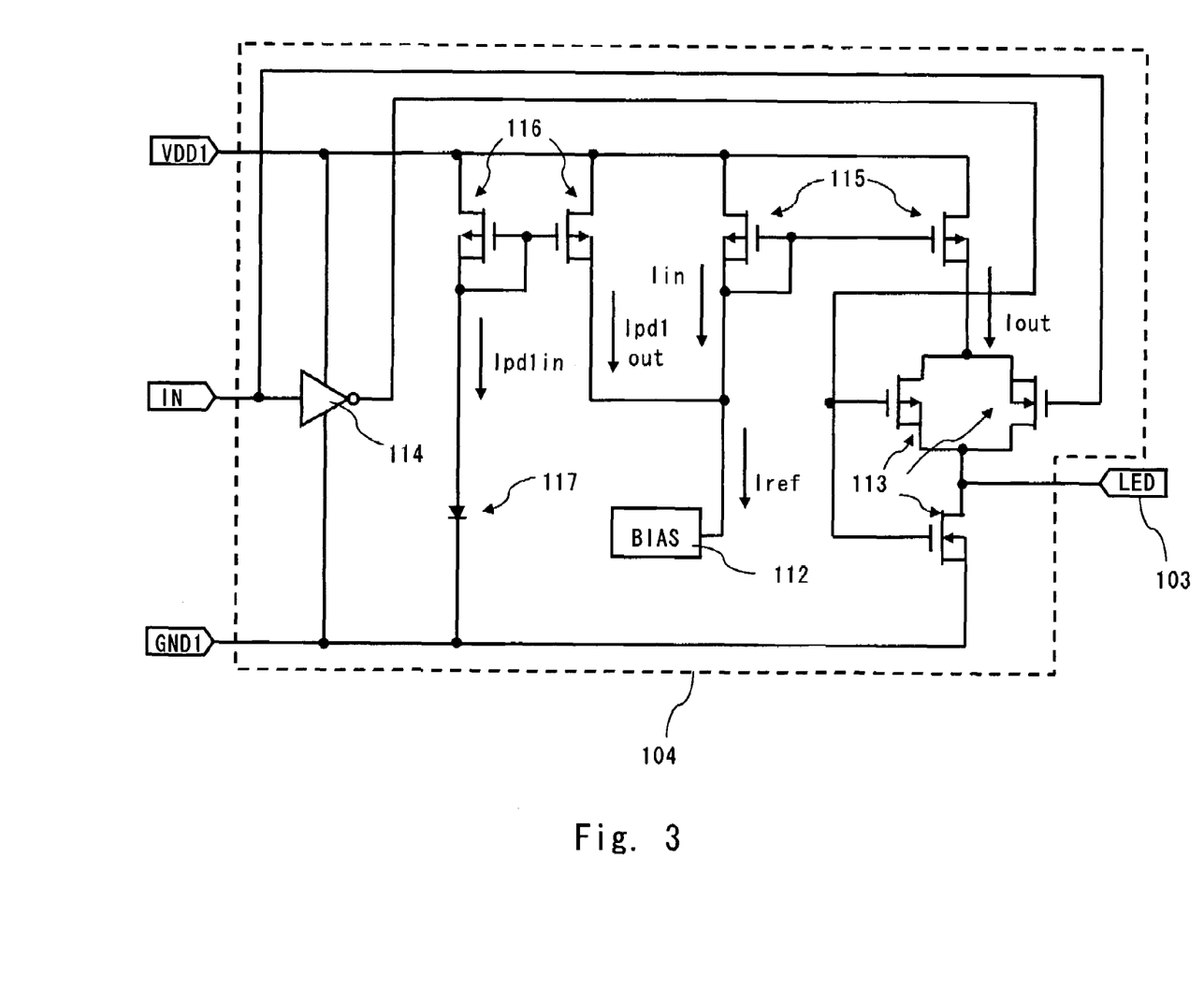
FIG. 3 is a view showing the configuration of a driver used in the photocoupler according to a first embodiment of the present invention.

The driver 104 according to this embodiment is described hereinafter in detail. FIG. 3 illustrates the configuration of the driver 104 according to this embodiment. As shown in FIG. 3, the driver 104 includes a bias circuit 112, a switching circuit 113, an inverter 114, a current amplifier 115, a photodiode current amplifier (hereinafter referred to as a PD amplifier) 116, and a monitor photodiode (hereinafter as a monitor PD) 117, which are integrated in one chip. The driver 104 has at least four terminals: two power supply terminals (VDD1 and GND1) for connection with the input lead frame 101, a terminal (IN) for signal input, and a terminal (LED) for current supply to the LED 103.

The driver 104 is driven with a power supply voltage which is a voltage between the terminals VDD1 and the GND1. The inverter 114 drives the switching circuit 113 using a voltage signal which is supplied through the terminal IN. The input end of the inverter 114 is connected to the terminal IN. The output end of the inverter 114 is connected to the switching circuit 113. The switching circuit 113 controls ON/OFF of the LED 103 based on the voltage signal.

The bias circuit 112 supplies a constant current Iref for causing light emission in the LED 103. The current amplifier 115 is a current mirror which amplifies a current Iin to a current Iout which is large enough to cause light emission in the LED 103. A current mirror ratio of the current amplifier 115 is α1. The LED 103 emits the light having the intensity corresponding to the current Iout which is supplied while the switching circuit 113 is ON.

The monitor PD 117 converts the reflected light reflected by the half mirror 106 into a current Ipd1in. The monitor PD 117 is a photodetector which detects reflected light and outputs a current Ipd1in as a detection signal. The PD amplifier 116 is a current mirror which converts the current Ipd1in generated by the monitor PD 117 into a current Ipd1out. A current ratio of the PD amplifier 116 is α2. The current amplifier 115 and the PD amplifier 116 are connected to the bias circuit 112.

The operation of the photocoupler 100 according to this embodiment is described hereinafter. When HI level is input to the terminal IN, the switching circuit 113 turns ON. In accordance with the current Iin, a current Iout which is amplified at a prescribed amplification rate is supplied to the LED 103. The LED 103 emits the light having the intensity corresponding to the current Iout. A part of the optical signal emitted from the LED 103 passes through the half mirror 106 and enters the light receiver 105. The photodiode 109 of the light receiver 105 generates a current signal Ipd2 corresponding to the transmitted light.

Other part of the optical signal emitted from the LED 103 is reflected by the half mirror 106 and enters the driver 104. The reflected light is converted into a corresponding current signal Ipd1in by the monitor PD 117 of the driver 104. If the current mirror ratios of the current amplifier 115 and the PD amplifier 116 are α1 and α2, respectively, the relationship between Iout and Ipd1in can be expressed as follows:

Expression 1:

$$Iref = Iin + Ipd1out$$
$$= Iout * \alpha1 + Ipd1in * \alpha2$$

Because the current Iref which is supplied from the bias circuit 112 is constant, the current Iout which is supplied to the LED 103 is controlled according to the current Ipd1in which is generated by the monitor PD 117. For example, if the light emission intensity of the LED 103 increases, the reflected light by the half mirror 106 increases accordingly. As a result, the current Ipd1in which is generated by the monitor PD 117 increases as well. In such a case, the driver 104 operates so as to reduce the current Iin which is supplied to the LED 103 in order to reduce the light emitting power of the LED 103. On the other hand, if the light emission intensity of the LED 103 decreases, the reflected light by the half mirror 106 decreases accordingly. As a result, the current Ipd1in which is generated by the monitor PD 117 decreases as well. In such a case, the driver 104 operates so as to enlarge the current Iin which is supplied to the LED 103 in order to enlarge the light emitting power of the LED 103.

In this way, the drive current Iout which is supplied to the LED 103 changes in accordance with the light emission intensity of the LED 103, thereby enabling the light emission intensity of the LED 103 to be uniform. Consequently, the current signal Ipd2 which is generated by the photodiode 109 is always constant. Therefore, even if a gain is increased and a bandwidth is narrowed down for higher CMR, for example, low pulse width distortion can be achieved relatively easily by simply adjusting the threshold of the comparator in the light receiver 105. This realizes the achievement of both high CMR and low pulse width distortion, which have been in the relation of trade off each other, at the same time.

Second Embodiment

Figure 4:
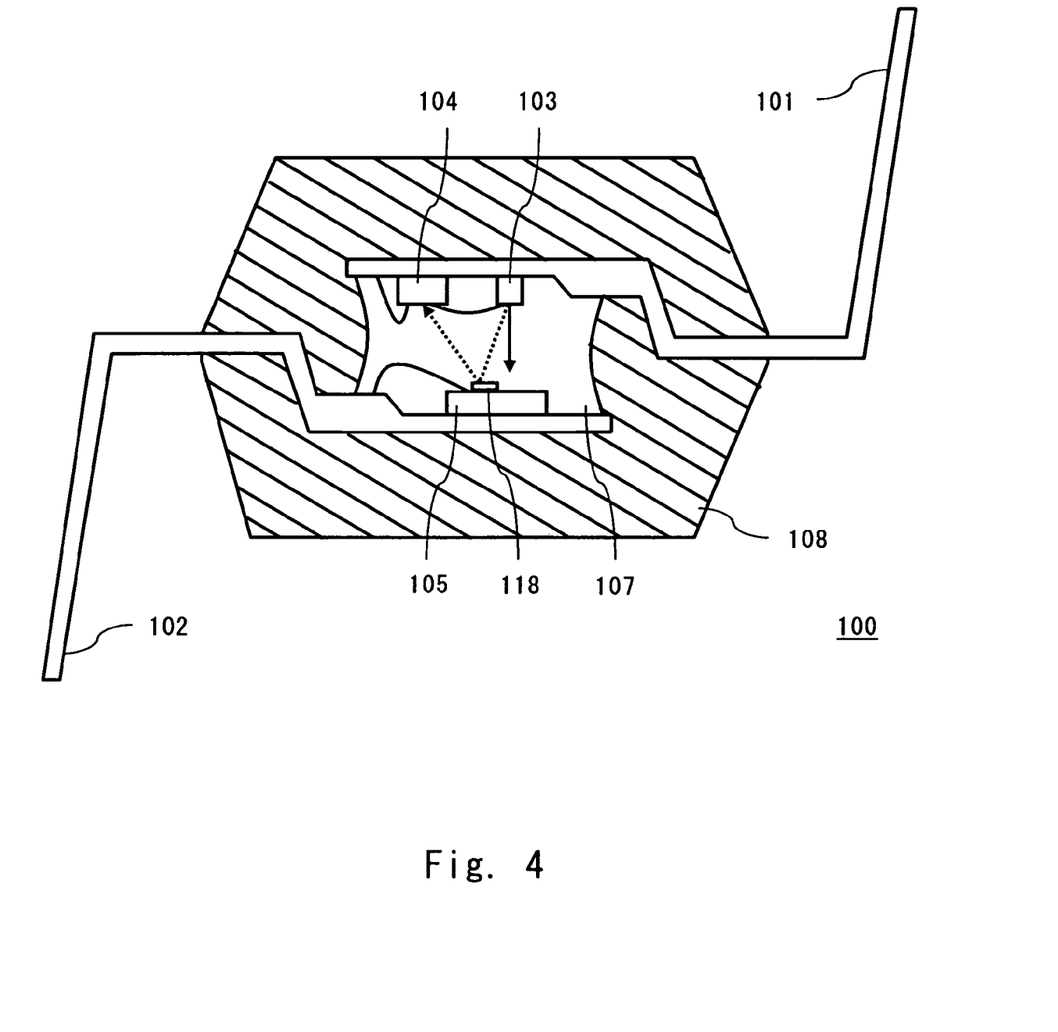
FIG. 4 is a view showing the configuration of a photocoupler according to a second embodiment of the present invention.

A second exemplary embodiment of the present invention is described hereinafter with reference to FIG. 4. FIG. 4 illustrates the configuration of the photocoupler 100 according to this embodiment. In FIG. 4, the same elements as in FIG. 1 are denoted by the same reference numerals and no redundant description is provided therefor. In this embodiment, a reflective light reflector 118 is disposed on the light receiver 105, instead of using the semi-transmissive half mirror 106 as described in the first embodiment.

Referring to FIG. 4, the photocoupler 100 of this embodiment includes the input lead frame 101, the output lead frame 102, the LED 103, the driver 104, the light receiver 105, the light transmitting resin 107, the light shielding resin 108, and the light reflector 118. The components other than the light reflector 118 are arranged as described in the first embodiment. The light reflector 118 is a reflective thin film and it may be, but not limited to, a dielectric film. The light reflector 118 is formed on a part of the surface of the light receiver 105, facing the LED 103. The light reflector 118 is placed in such a position that is not between the LED 103 and the photodiode 109 which are arranged so that their optical axes are aligned. In this configuration, a part of the light emitted from the LED 103 directly enters the light receiver 105 as indicated by the arrow in FIG. 4. Then, the photodiode 109 of the light receiver 105 generates a current signal Ipd2 corresponding to the incident light.

On the other hand, the light reflector 118 reflects a part of the light emitted from the LED 103 toward the driver 104 as indicated by the dotted arrow in FIG. 4. The light reflector 118 is an optical element which controls the traveling direction of light. Such use of the light reflector 118 enables control of a drive current to the LED 103 using the reflected light emitted by the LED 103 and reflected by the light reflector 118.

The operation of the photocoupler 100 according to this embodiment is described hereinafter. When HI level is input to the terminal IN, the switching circuit 113 turns ON. In accordance with the current Iin, a current Iout which is amplified at a prescribed amplification rate is supplied to the LED 103. The LED 103 emits the light with the intensity in accordance with the current Iout. A part of the optical signal emitted from the LED 103 directly enters the light receiver 105. The photodiode 109 of the light receiver 105 generates a current signal Ipd2 corresponding to the transmitted light.

Other part of the optical signal emitted from the LED 103 is reflected by the light reflector 118 and enters the driver 104. The reflected light is converted into a corresponding current signal Ipd1in by the monitor PD 117 of the driver 104. Iout and Ipd1in have the relationship of Expression 1 as described above. Because the current Iref which is supplied from the bias circuit 112 is constant, the current Iout which is supplied to the LED 103 is controlled according to the current Ipd1in which is generated by the monitor PD 117. In this way, the drive current Iout which is supplied to the LED 103 changes in accordance with the light emission intensity of the LED 103, thereby enabling the light emission intensity of the LED 103 to be uniform. This realizes the achievement of both high CMR and low pulse width distortion at the same time.

It is apparent that the present invention is not limited to the above embodiment and it may be modified and changed without departing from the scope and spirit of the invention.

What is claimed is:

1. An optical coupling device comprising:
   a light emitting element;
   a driver supplying a drive signal to the light emitting element in accordance with an input signal;
   a first light receiving element placed face to face with the light emitting element, receiving an optical signal output from the light emitting element, converting the optical signal into an electrical signal and outputting the electrical signal; and
   a half mirror placed between the light emitting element and the first light receiving element,
   wherein the driver monitors signal intensity of the optical signal and controls the signal intensity to be uniform,
   wherein the light emitting element, the driver, and the first light receiving element are sealed together in a single package by resin, and
   wherein the driver comprises a second light receiving element, and a part of the optical signal enters the second light receiving element disposed in the driver.

2. The optical coupling device according to claim 1, wherein
the light emitting element comprises a light emitting diode (LED), and the second light receiving element comprises a photodiode.

3. The optical coupling device according to claim 1, wherein the driver comprises:
   the second light receiving element;
   a first current mirror circuit driven by an optical current generated by the second light receiving element based on a part of the optical signal;
   a second current mirror circuit driven by a differential current of an output current from the first current mirror circuit and a constant current supply; and
   a switching circuit for switching an output current from the second current mirror circuit with the input signal to turn ON/OFF the light emitting element.

4. The optical coupling device according to claim 2, wherein the driver comprises:
   the second light receiving element;
   a first current mirror circuit driven by an optical current generated by the second light receiving element based on a part of the optical signal;
   a second current mirror circuit driven by a differential current of an output current from the first current minor circuit and a constant current supply; and
   a switching circuit for switching an output current from the second current mirror circuit with the input signal to turn ON/OFF the light emitting element.

5. The optical coupling device according to claim 3, wherein
the driver is integrated in one chip.

6. The optical coupling device according to claim 4, wherein the driver is integrated in one chip.

7. The optical coupling device according to claim 1, wherein the first light receiving element comprises:
   a photodiode;
   a first amplifier connected to the photodiode;
   a dummy photodiode having substantially a same configuration as the photodiode;
   a second amplifier connected to the dummy photodiode; and
   a differential amplifier for receiving outputs from the first amplifier and the second amplifier.

8. The optical coupling device according to claim 1, wherein the input signal comprises an electrical signal.

9. The optical coupling device according to claim 8, wherein the input signal and the output signal are electrically disconnected from each other.

10. The optical coupling device according to claim 8, wherein the driver and the first light receiving element are electrically disconnected from each other.

11. An optical coupling device comprising:
    a light emitting element;
    a driver supplying a drive signal to the light emitting element in accordance with an input signal;
    a first light receiving element placed face to face with the light emitting element, receiving an optical signal output from the light emitting element, converting the optical signal into an electrical signal and outputting the electrical signal; and
    a light reflector placed on a surface of the first light receiving element, for reflecting a part of the optical signal,
    wherein the driver monitors a signal intensity of the optical signal and controls the signal intensity to be uniform,
    wherein the light emitting element, the driver, and the first light receiving element are scaled together in a single package by resin, and wherein the driver comprises a second light receiving element, and a part of the optical signal enters the second light receiving element disposed in the driver.

12. The optical coupling device according to claim 11, wherein the light emitting element comprises a light emitting diode (LED), and the second light receiving element comprises a photodiode.

13. The optical coupling device according to claim 11, wherein the driver comprises:

the second light receiving element;

a first current mirror circuit driven by an optical current generated by the second light receiving element based on a part of the optical signal;

a second current mirror circuit driven by a differential current of an output current from the first current mirror circuit and a constant current supply; and a switching circuit for switching an output current from the second current mirror circuit with the input signal to turn ON/OFF the light emitting element.

14. The optical coupling device according to claim 12, wherein the driver comprises:

the second light receiving element;

a first current mirror circuit driven by an optical current generated by the second light receiving element based on a part of the optical signal;

a second current mirror circuit driven by a differential current of an output current from the first current mirror circuit and a constant current supply; and a switching circuit for switching an output current from the second current mirror circuit with the input signal to turn ON/OFF the light emitting element.

15. The optical coupling device according to claim 13, wherein the driver is integrated in one chip.

16. The optical coupling device according to claim 14, wherein the driver is integrated in one chip.

* * * * *